Patented Oct. 3, 1939

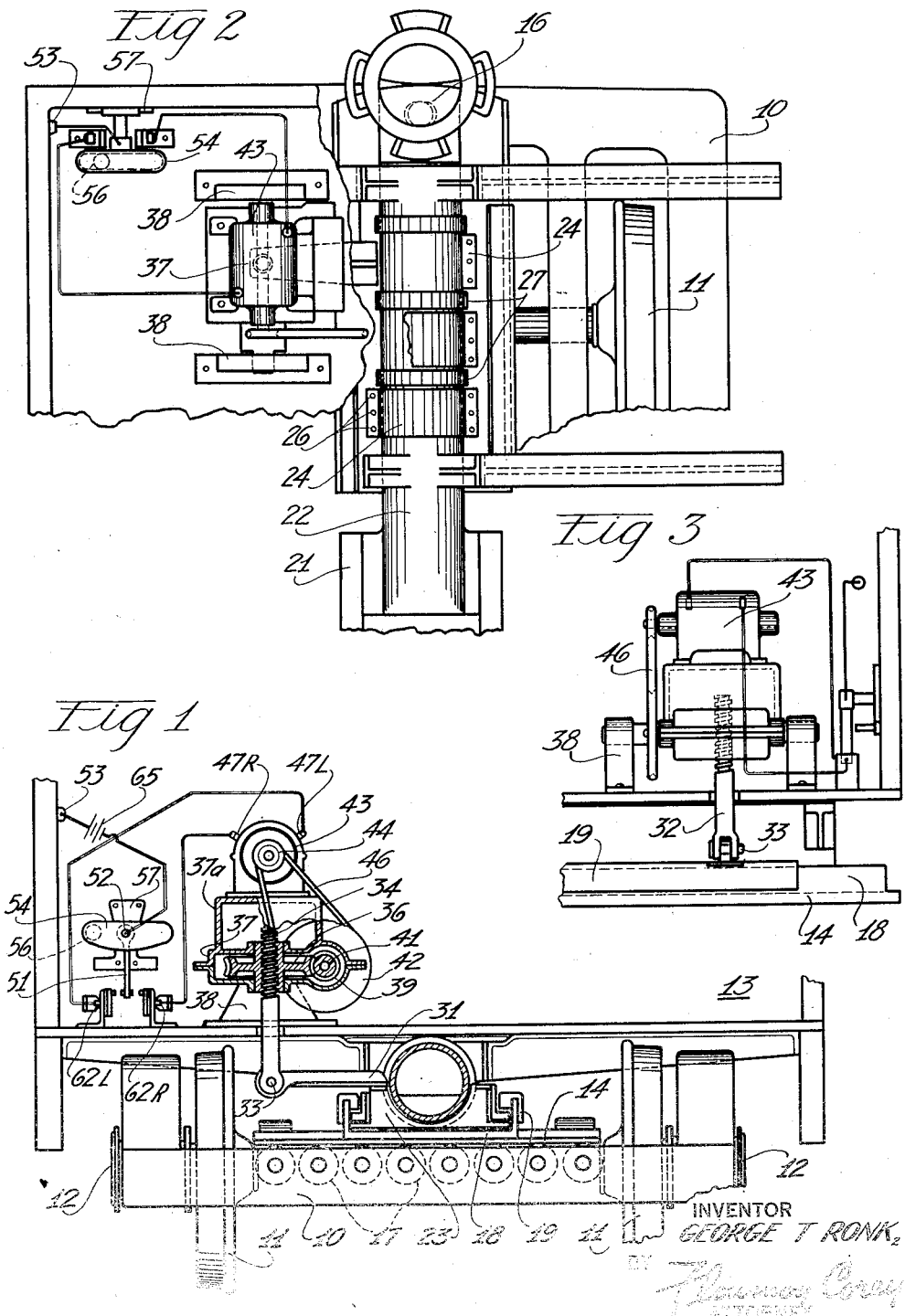

2,174,997

UNITED STATES PATENT OFFICE 2,174,997

VEHICLE

George T. Ronk, Lanark, Ill.

Application May 8, 1935, Serial No. 20,355

12 Claims. (Cl. 105—199)

This invention relates to vehicles and has particular relation to automatic means for maintaining a vehicle such as a train coach with its vertical axis coincident with the balanced component of centrifugal force and gravity regardless of whether the vehicle is in angular acceleration or in rectilinear motion and regardless of the angle of tilting or banking of the track.

The development of high speed, articulated, stream-lined trains has forced reform of track construction with much steeper banking of tracks on curved sections to overcome the discomfort and danger of the action of centrifugal force. It is obvious that the degree of banking of a given curve must be determined for a certain selected train speed and that at other speeds, higher or lower, the degree of banking is incorrect. It is further obvious that in practical operation these curves will be made by trains often running at much slower speeds due to automatic block signals and other conditions and the curves may also be made at higher speeds than the degree of banking is designed for. These slower speeds will result in great discomfort to passengers due to the "sliding-down-hill" sensation of too greatly banked curves and the higher speeds will result in a "thrown-up-hill" sensation on curves not sufficiently banked. Furthermore, as the march of progress demands still higher speeds, this discomfort will grow. Therefore, modern demands for luxurious travel require the banking of the car itself shall be automatically determined in accordance with angular acceleration of the train in order that passengers and table service may be held firmly in comfortable contact with the plane of support.

It is the purpose of this invention to provide an automatic car banking means of inexpensive construction, and simplicity of design which shall be economical of space and adaptable to the equipment and operating conditions found on advanced articulated trains.

It is a further purpose to provide a banking mechanism of both light weight and positive action, automatically locking against rolling about the transverse axis of the vehicle, while functioning to vary the relation of the vehicle to its supporting truck.

It is a further purpose to provide a control means for controlling the banking mechanism which will cause the banking mechanism actuating means to rotate in either direction to vary the degree of bank in accordance with the action of the resultant component of centrifugal force and gravity on the control means.

It is a further purpose to provide a flexibly connected control means for the banking mechanism prime mover which has a fixed relation to the plane of the car floor; but which is controlled to cause the plane of the car floor to approximately coincide with the component of gravity and angular acceleration by changing the angle between the car and its supporting trucks.

It is a further purpose to provide a pivotally mounted mechanical assembly which will maintain a fixed relation to the banking mechanism prime mover, said mechanical assembly being attached to the car floor and said mechanical assembly also being adjustably connected to the car truck to allow a variable relation to the plane of the car truck.

It is a further object of the invention to provide control means responsive to the resultant between the forces of gravity and angular acceleration and damping means for the control means to prevent over-control.

It is a further purpose to provide a tubular sill head and sill head mounting for the car center sill which will permit the controlled rotation of the car with respect to its truck plane of reference.

Other and further features and objects of the invention will be more apparent to those skilled in the art upon a consideration of the accompanying drawing and following specification, wherein is disclosed an exemplary embodiment of the invention, with the understanding, however, that such changes may be made therein as fall within the scope of the appended claims, without departing from the spirit of the invention.

In said drawing:

Figure 1 is a view, partly in elevation and partly in section, of a portion of a truck and of the banking and control mechanism for banking a car.

Figure 2 is a partial plan view of the truck and of the banking and control mechanism shown in Figure 1 in which portions are broken away for clearer illustration; and Figure 3 is a side elevational view of the banking and control mechanism.

While a banking mechanism, constructed according to various embodiments of my invention, may be employed for many types of vehicles, the embodiment of the invention here shown is particularly applicable for use with high-speed, articulated, stream-lined trains described in my co-pending application, Serial Number 9,135, filed March 4, 1935, on Trucks and in which a truck and car supporting structure is described.

Referring now to the drawing:

A structure embodying my invention employs a substantially rectangular truck frame 10 in which wheels 11 are rotatably mounted by means of axle bearings 12. The rectangular truck frame 10 provides a bed on which the car body, indicated generally at 13, may be mounted.

In a preferred mounting of the car body on the truck, a wide wear plate 14 is pivotally engaged on the platform formed by the truck frame 10, by means of a pivot 16, which permits the truck frame and truck to pivot about with reference to the wear plate 14. The end of the wear plate opposite to the pivot pin 16 is supported by a series of transversely and arcuately disposed rollers 17 which permit the wear plate to roll on the truck frame with a minimum of friction and of wear.

The wear plate 14 is secured to the under side of a channel-like sill plate 18 to which are attached replaceable wear slides 19. The under side of the car 13 is supported by means of a sill 21, which is a long box-like beam member extending longitudinally of the car and adapted to support the car. The sill 21 is provided at each end with substantially tubular sill heads 22 which extend beyond the end of the sill and on which the trucks are pivotally mounted for movement about a longitudinal axis of the car sill, in accordance with a structure hereinafter described. This cylindrical sill head is supported on a rectangular sill plate 23.

The sill plate 23 is secured to the tubular portion of the sill head 22 by means of wide strap-like bearing caps 24 which form the upper halves of the bearings for the sill head 22 and which are secured to the plate 23 as by means of bolts 26. Longitudinal shifting of the truck with reference to the sill head is prevented by flanges 27 on the sill head. It is apparent, therefore, that the sill heads 22 and sills 21 and consequently the car 13, may rotate on the trucks 10 about the longitudinal axis defined by the cylindrical sill heads 22.

It is one of the purposes of my invention to provide means for automatically rotating the car about this longitudinal axis in response to the component forces of gravity and centrifugal force. It is apparent that in rectilinear movement of a car, as for instance on a straight track, the centrifugal force factor will coincide with the gravity factor and that the car should then be held in a horizontal plane. It is one of the objects of my invention to provide means for maintaining the vehicle in this horizontal position even if the track should tilt. It is another object of the invention to cause the car to tilt to the proper degree when rounding a curve so that the plane of the car floor is perpendicular to a resultant of centrifugal force and gravity. These results are secured by a mechanism I am about to describe.

In practicing my invention I preferably utilize lever arms 31 which extend horizontally outwardly from the top of the sill plates 23 to which they are secured in any suitable manner. A vertically extending actuator shaft 32 is provided and this shaft extends upwardly through the floor of the car 13 and is pivotally engaged to the free end of the lever arm 31, as by means of a pivot pin 33. The shaft 32 is threaded at its upper end, as indicated at 34, and a worm gear 36 is threaded on the threads of the shaft. The worm gear is rotatably mounted in a supporting frame 37 which is, in turn, pivotally supported for oscillatory movement in bearings 38 which are fastened to the car floor.

It is apparent that, if the worm gear 36 is rotated in a clockwise direction when viewed from above, the shaft 32 will be moved upwardly to cause the car 13 to tilt to the left. If the worm gear 36 is rotated in the opposite direction the shaft will be driven downwardly and the car body rotated to the right.

The worm gear 36 is adapted to be driven by means of a worm 39 which is mounted on the shaft 41 to which a pulley 42 is attached. A motor 43 is mounted on top of the casing 37a, which in turn is mounted on the casing 37 in which the worm wheel is mounted. A pulley 44 of the motor 43 is adapted to drive the pulley 42 by means of a belt 46.

The motor 43 is reversible and if the current is furnished to the binding post 47L of the motor, it will rotate in a clockwise direction to drive the worm 39 in such a direction as to turn the worm gear 36 in a clockwise direction to screw shaft 32 upwardly to cause car 13 to tilt to the left. If the current is furnished to the binding post 47R the motor is rotated in a counter-clockwise direction to turn the worm gear 36 in the counter-clockwise direction and cause the shaft 32 to move downwardly to cause the car to tilt to the right.

It is apparent, therefore, that if we now furnish control means for rotating the motor 43 in one direction or the other in accordance with the desirability of positioning the car we can then cause the car to rotate to the desired position. Any suitable means may be employed for this purpose but, in the embodiment of the invention here shown, I have provided a switch mechanism employing a depending contact arm 51 pivotally supported on a pivot pin. The arm and the pivot pin also serve to carry electric current to a ground connection indicated at 53 which, of course, connects with the grounded side of the motor 43. The contact arm 51 is provided with a small horizontally extending cupped cage 54 in which a weight such as the ball 56 may roll. The pivot pin 52 is secured to a plate 57 which is mounted on the car 13. A contact 62R is provided to one side of the contact arm 51 and in the path of the arm as it swings in an arc about the pivot 52. This contact 62R is electrically connected with the post 47R of the motor 43. Another contact 62L is provided on the other side of the contact arm 51 and is positioned in the arc of the swing of the contact arm 51. This contact 62L is electrically connected with the binding post 47L of the motor 43.

If the ball 56 rolls to either side of the cage 54 the contact arm 51 will swing in an arc to make electrical connection with either contact 62R or contact 62L. If the contact arm 51 contacts 62L it will complete the circuit from the power supply source 65 through the contact arm 51, contact 62L, binding post 47L and back through the ground to the power supply 65 to rotate the gear 36 in a clockwise direction to cause the car 13 to tilt to the left. If the contact arm 51 makes electrical connection with contact 62R it will complete the circuit from the power source 65, through arm 51, contact 62R, binding post 47R and ground connection back to the power supply to rotate the motor in a counterclockwise direction to tilt the car to the right.

Referring now more particularly to Figure 1, it is apparent that if the car should tilt to the left, as for instance in rounding a left curve at too slow a speed for the banking of the curve, the ball 56 will roll to the left side of the cupped cage 54 causing the control arm 51 to swing in an arc to the right to give the proper circuit to cause the car to tilt to the right to counteract the tilting and bring the car floor to a plane which is perpendicular to the component of the centrifugal force and the force of gravity. If the car is tilted to the right, as for instance in negotiating a left curve at a higher speed than the banking of the curve calls for, the ball 56 will roll to the right side of the cupped cage 54 causing control arm 51 to swing in an arc to the left to energize the motor 43 to rotate the gear 36 in a clockwise direction to tilt the car to the left.

It is apparent that by this means I am then able to maintain the floor of the car at all times in a position substantially perpendicular to the component of gravity and angular acceleration, and that in this way discomfort to the passengers in the vehicle, and sliding about and movement of articles in the car is avoided. The sensitivity of the device may be controlled by means of the ball 56 and the curve of the cage 54 in which the ball runs. A liquid such as mercury may also be introduced into the cup to control the sensitivity of the device. If the curve at the bottom of the cage 54 is flattened the sensitivity of the device is considerably increased and it will require relatively little tilting of the car before the leveling or banking mechanism is actuated. On the other hand if the curve of the bottom of the cage 54 is of short radius the sensitivity of the device will be greatly reduced and considerable movement of the car will be required to set the banking mechanism in operation.

It is apparent that modifications may be made by those skilled in the art. Such modifications may be made without departing from the spirit and scope of my invention as set forth in the appended claims.

I claim as my invention:

1. In a device of the character described including a car, a truck, and a truck sill pivotally engaged for movement about a longitudinal axis between the car and the truck, lever means attached to the truck for rotating the car with respect to the truck, actuating means mounted on the car for changing the position of the car relative to the lever means, and control means supported by the car responsive to the component forces of gravity and angular acceleration for controlling the actuating means.

2. In a device of the character described, a car, a sill secured to the bottom of the car and having an extension thereof to form a cylindrical journal, a truck pivotally engaged to the sill extension for rotation about the axis thereof, means including a threaded shaft projecting through the floor of the car and pivotally engaged to the truck, and means threaded for rotation on the threaded shaft but held in fixed relation to the floor of the car whereby rotation of the last named means in one direction or the other correspondingly tilts the car about the axis of the sill extension.

3. In a car banking device, a car, a sill for supporting the car, an extension of the sill extending beyond the end of the sill and so formed as to provide a journal, a truck having bearings for engaging the journal formed by the extension of the car sill to permit the sill to rotate on the truck to a limited degree, a lever arm engaged to the bearings of the truck, a shaft pivotally engaged to the free end of the lever arm and projecting through the floor of the car, the upper end of the shaft being threaded, a gear threaded on the shaft, said gear supported in fixed relation to the floor of the car, motor means for rotating the gear, means responsive to component forces of gravity and angular acceleration, said last named means having contact members, and electrical circuits between the contacts of the last named means and the motor means for driving the motor in one direction or the other as the car is tilted to one side or the other.

4. In a vehicle including a car and a truck, means for supporting the car on the truck including a sill having a tubular portion adapted for rotation on the truck, and means for rotating the car with respect to the truck comprising a lever engaged to the car supporting means, said lever held in fixed relation to the truck, a threaded shaft pivotally engaged to the lever, and means operatively engaged to the car for threadedly engaging the threaded shaft.

5. A means for causing a railway car floor to assume a position perpendicular to the component of gravity and angular acceleration comprising a car, a truck, means for mounting the car on the truck for pivotal movement about a longitudinal axis of the car, threaded shaft means pivotally engaging the truck, means supported in substantially fixed position relative to the car floor and threaded for engaging the threaded shaft, means supported in fixed relation to last mentioned threaded means for driving the threaded means engaging the threaded shaft in either direction, whereby rotating the said threaded means tilts the car, and self acting control means on the car for controlling the driving means in accordance with the action of gravity and angular acceleration.

6. In a vehicle including a car and a truck, means for mounting the car on the truck for pivotal movement about the longitudinal axis thereof comprising a tubular sill head and means for rotatably engaging the sill head to the truck, lever means on the truck, tilting means on the car for tilting the car with respect to the lever means, and a control means on the car responsive to the component between angular acceleration and gravity for activating the tilting means.

7. A means for causing a railway car floor to assume a position perpendicular to the component of gravity and angular acceleration including a car, a truck, hinged means for mounting the car on the truck for pivotal movement about a single longitudinal axis of the truck, power means including a nut and threaded shaft engaged between the car and the truck for tilting the car about the said longitudinal axis of the truck, and a self acting control means mounted on the car to activate said power means in accordance with the action of gravity and angular acceleration upon said control means.

8. In a vehicle including a car and a truck, hinged means for mounting the car on the truck for pivotal movement about a single longitudinal axis of the truck, means operatively connected to the car and the truck for tilting the car with respect to the truck, means engaged with last mentioned means for actuating the tilting means, and control means on the car responsive to the component of angular acceleration and gravity for controlling the actuating means.

9. A means for causing a railway car floor to assume a position perpendicular to the component of gravity and angular acceleration comprising a car, a truck, a car sill, means for mounting the car on the truck for pivotal movement about a longitudinal axis of the car sill, power means including a threaded shaft and nut engaged between the car and the truck for tilting the car about the longitudinal axis of the said sill, and control means on the car for activating the power means in accordance with the component of the forces of gravity and angular acceleration.

10. The combination, in a car tilting device, of a car, a truck, means for mounting the car on the truck for rotation about a single axis with respect to the truck, and means operatively connected to the car and the truck for causing the car to be rotated about said axis in response to the resultant force component of gravity and angular acceleration, comprising a lever mechanism connecting with the truck, power means on the car for actuating the said lever mechanism, and a power regulating means on the car comprising a pivotally mounted, weighted, two-circuit electric switch.

11. The combination, in a car banking device of a truck, a car rotatably engaged on the truck, a lever connected with the truck for rotating the car with respect to the truck, and means for moving the car with respect to the lever comprising a shaft pivotally engaged to the lever arm and threaded at one end, a gear threadedly engaged on the shaft and rotatably engaged to the car, means for confining the gear to one position with reference to the car floor, and a motor supported in fixed relation to the gear adapted to drive the said gear selectively in one direction or the other.

12. In a vehicle, including a car and a truck, means for mounting the car on the truck for pivotal movement about the central longitudinal axis thereof comprising a tubular sill head, means for rotatably engaging the sill head to the truck, and offset means for tilting the car with respect to the truck including a lever engaged to the car mounting means and held in fixed relation to the truck, a shaft pivotally engaged to the lever, and a nut threaded on the shaft, said nut held in substantially fixed vertical relation to the floor of the car.

GEORGE T. RONK.